April 8, 1958
C. H. BARTLETT
2,829,919
SUN VISOR ATTACHMENT FOR VEHICLES
Filed Nov. 29, 1955
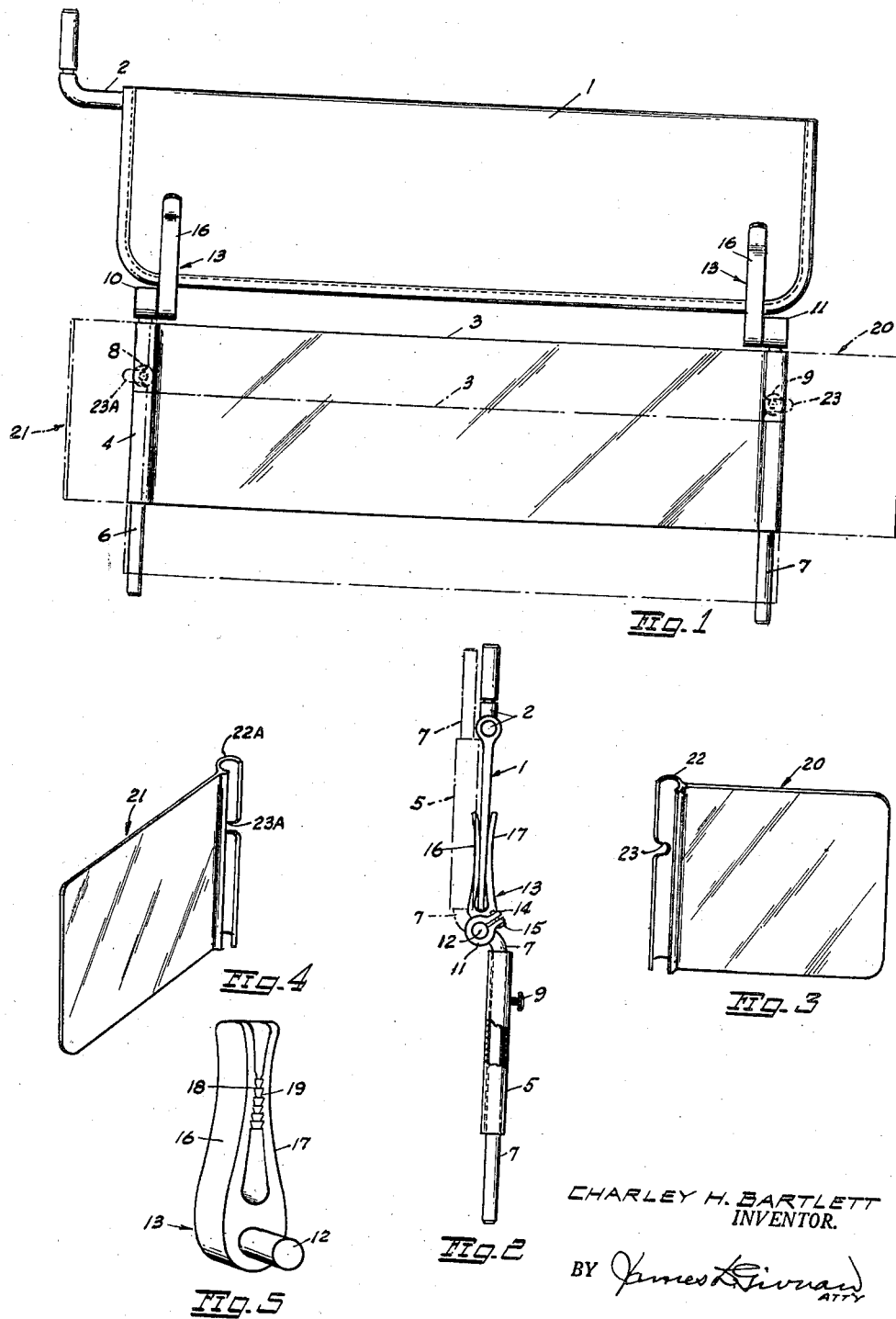
CHARLEY H. BARTLETT
INVENTOR.
BY James Givnan
ATTY

United States Patent Office 2,829,919
Patented Apr. 8, 1958

2,829,919
SUN VISOR ATTACHMENT FOR VEHICLES

Charley H. Bartlett, Myrtle Point, Oreg., assignor of one-half to Daniel J. Melton, Myrtle Point, Oreg.

Application November 29, 1955, Serial No. 549,625
1 Claim. (Cl. 296—97)

This invention relates to improvements in automobile sun visors and more particularly to an auxiliary glare and light shield attachment for shielding the eyes of an operator or an occupant from the direct rays of the sun or indirect reflections from metallic parts, such as the hood of the vehicle, as well as screening the rays of headlights of oncoming vehicles.

It is one of the principal objects of the invention to provide a readily attachable and detachable glare and light shield of the character described for use with a conventional vehicle visor and so designed as to be quickly adjustable in a vertical plane as well as extensible laterally in a variety of positions when mounted on said visor, the shield being formed of a transparent material of such a color and character as to eliminate all glare and objectionable rays of light as aforesaid which the conventional visor is incapable of doing without obstructing the driver's vision.

Another object of the invention is to provide an auxiliary visor of this kind which has a main body plate of a size coincident with the length of the conventional sun visor and laterally extensions movable as a unit with the body plate and also independently thereof.

A further object is the provision of especially adaptable and novel connecting means between the conventional visor and the auxiliary visor eliminating the necessity of rivets and the like while at the same time providing a substantially permanent connection of the two visors to prevent any unintentional removal or theft of the auxiliary visor attachment.

A still further object of the invention is the provision of an auxiliary visor of this character which is of simple, efficient, durable, and such inexpensive construction that it can be manufactured and sold at a relatively low cost.

The foregoing and other objects will appear as my invention is more fully hereinafter described in the following specification, illustrated in the accompanying drawing, and finally pointed out in the appended claim.

In the accompanying drawing:

Figure 1 is a rear view of a conventional sun visor showing attached thereto and depending therefrom an auxiliary visor made in accordance with my invention.

Figure 2 is a view of the right-hand end of Figure 1.

Figures 3 and 4 are perspective detail views of wing attachments for the main body plate of the auxiliary visor.

Figure 5 is an enlarged perspective detail view of one of a pair of identical automatic clamping elements.

Referring now more particularly to the drawing:

In Figures 1 and 2 reference numeral 1 indicates a conventional sun visor ordinarily provided as standard equipment for automobiles, such visor being usually formed of a cloth covering placed over a stiff backing, the whole being mounted for swingable movement in a vertical plane on a horizontal rod 2 which in turn is supported in a bracket (not shown) for swinging movement in a horizontal plane whereby the visor 1 may be placed either in front of or to the left side of the driver, all in the well known manner. To obviate the shortcoming of the conventional visor, as aforesaid, I provide an auxiliary glare and light shield which consists of a main body plate 3 of plastic material, celluloid or any other suitable material having the desired light filtering properties and preferably of a length and width not exceeding the length and width of the conventional visor. Both ends of the plate 3 are molded into vertical sleeve portions 4 and 5 by means of which the plate is slidably attached to a pair of arms 6 and 7 and lockable with respect thereto in any adjusted position by means of set screws 8 and 9 carried by the sleeve portions.

The top ends of the arms 6 and 7 are turned slightly rearwardly and terminate in hinge elements 10 and 11 by means of which the arms are swingably clamped to stub shafts 12 extending laterally from the bottom ends of clamping elements 13 for attaching the auxiliary visor assembly to the conventional visor 1. Each of said hinge element is provided with flanges 14 adjustably compressible by a screw 15 extending therethrough to produce the desired amount of friction between the stub shaft and the hinge element to hold the arms 6 and 7 and plate 3 in any preadjusted position in relation to the conventional visor 1.

Each clamping element 13 comprises a pair of spring fingers 16 and 17 of equal length provided with opposing internal serrations 18—19, respectively, substantially at their center sections and adapted to automatically penetrate or bite into the opposite cloth covered surfaces of the visor 1 as the fingers come into sprung engagement therewith. The serrations will thus prevent displacement of the clamping elements in any direction when the auxiliary visor is installed or attached to the main visor 1.

In order to extend the auxiliary visor 3 longitudinally when desired I provide a pair of right and left-hand wings 20 and 21 shown, respectively, in Figures 1, 3 and 4 and made of the same light filtering material as the main body plate 3. One vertical edge of each wing is molded into a longitudinally split sleeve 22—22A adapted for quick and convenient snap-on attachment to the sleeve portions 5 and 4 of the main body plate 3. The free edge of each split sleeve is notched inwardly as at 23—23A to provide clearance for the set screws 9 and 8 as the wings are swung about the sleeve portions 5 and 4 into adjusted positions relative to the main body plate 3.

From the foregoing it will be apparent that the auxiliary visor 3 is settable in any adjusted position with respect to the main visor 1 by means of its hinged attachment to the clamping elements 13 and that the extension wings 20—21 are similarly settable with respect to the main body plate 3 by means of their snap-on attachment to the sleeve portions 5 and 4 of the main body plate.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

An auxiliary glare and light shield device for attachment to a vehicle sun visor, said device comprising a pair of individual clamping elements each comprising a pair of spring fingers of equal length and being provided with opposing internal serration substantially at their center section and thereby adapted to adjustably grip and depend from opposite sides of a vehicle sun visor, a stub shaft integrated with and extending laterally from the bottom end of each clamping element, a pair of hinge elements pivotally attached to said stub shafts, means carried by the hinge elements for producing variable friction between them and the stub shafts to hold the hinge elements in preadjusted positions relative to said clamping elements, a pair of independent parallel arms integrated with and extending outwardly from said hinge elements, said auxiliary light shield comprising a main body plate integrated with cylindrical sleeves at both of its ends and thereby slidably adjustably attached to said parallel arms, means extending to the interior of said sleeves for locking the same in adjusted positions relative to the length of said arms, a pair of wing elements hingedly and removably attached to said cylindrical sleeves at the ends of said main body plate, each of said wing elements being integrated along one of its sides with a truncated sleeve having a recess intermediate its ends and thereby adjustably pivotal relative to its respective sleeve of said main body plate and limited in its pivotal movement by said last mentioned means engaging within said recess.

References Cited in the file of this patent

UNITED STATES PATENTS

| | | |
|---|---|---|
| 1,931,020 | Clark | Oct. 17, 1933 |
| 1,973,009 | Mix | Sept. 11, 1934 |
| 2,252,716 | Levy | Aug. 19, 1941 |
| 2,400,958 | Simmons | May 28, 1946 |
| 2,528,038 | Crise | Oct. 31, 1950 |
| 2,596,873 | Solmes | May 13, 1952 |